US006736956B1

(12) United States Patent
Hemphill et al.

(10) Patent No.: US 6,736,956 B1
(45) Date of Patent: May 18, 2004

(54) NON-UNIFORM ETCHING OF ANODE FOIL TO PRODUCE HIGHER CAPACITANCE GAIN WITHOUT SACRIFICING FOIL STRENGTH

(75) Inventors: Ralph Jason Hemphill, Liberty, SC (US); Thomas V. Graham, Greenville, SC (US); Thomas Flavian Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 402 days.

(21) Appl. No.: 09/851,298

(22) Filed: May 7, 2001

(51) Int. Cl.⁷ .............................................. B23H 11/00
(52) U.S. Cl. ........................ 205/640; 205/666; 205/674; 205/223; 205/324; 205/221; 216/41; 216/47; 361/509
(58) Field of Search ................................ 205/221, 640, 205/666, 674, 223, 324; 216/41, 47; 361/509

(56) References Cited

U.S. PATENT DOCUMENTS

| | | | |
|---|---|---|---|
| 4,474,657 A | | 10/1984 | Arora |
| 4,518,471 A | | 5/1985 | Arora |
| 4,525,249 A | | 6/1985 | Arora |
| 5,131,388 A | | 7/1992 | Pless et al. |
| 5,660,737 A | | 8/1997 | Elias et al. |
| 5,914,852 A | * | 6/1999 | Hatanaka et al. ............ 361/523 |
| 6,224,738 B1 | * | 5/2001 | Sudduth et al. .............. 205/221 |
| 6,579,463 B1 | * | 6/2003 | Winningham et al. ........ 216/41 |

FOREIGN PATENT DOCUMENTS

WO    WO 00/19470    4/2000

* cited by examiner

Primary Examiner—Wesley A. Nicolas
(74) Attorney, Agent, or Firm—Steven M. Mitchell

(57) ABSTRACT

The present invention is directed to a method of etching anode foil in a non-uniform manner which increases the overall capacitance gain of the foil while retaining foil strength. In particular, by using a mask to protect a mesh grid of the foil from further etching, a previously etched foil can be further etched, prior to the widening step. Alternatively, the mask may be used in the initial etch, eliminating the need for the second process. In effect the foil may be etched to a higher degree in select regions, leaving a web of more lightly etched foil defined by the mask to retain strength. According to the present invention, the foil is placed between two masks with a grid of openings which expose the foil in these areas to the etching solution. The exposed area can be as little as 10% of the total foil to as much as 95% of the total foil, preferably 30% to 70% of the total foil area. The pattern is configured in such a way that the enhanced area does not create large scale strength defects such as perforation holes and is held in a pattern such as a hexagonal array, random array or radial burst array, such that the exposed area perimeter can be round, square, hexagonal, or triangular. The higher surface area in the exposed areas does not significantly decrease the strength of the foil as a whole, such that the method according to the present invention increases capacitance of the anode foil without significantly decreasing the strength of the foil.

15 Claims, 2 Drawing Sheets

US 6,736,956 B1

NON-UNIFORM ETCHING OF ANODE FOIL TO PRODUCE HIGHER CAPACITANCE GAIN WITHOUT SACRIFICING FOIL STRENGTH

BACKGROUND OF THE INVENTION

1. Field of the Invention

The present invention is directed to a method of etching anodic foil for it use in the manufacture of electrolytic capacitors and more particularly, to a method of non-uniform etching of anode foil to produce higher capacitance foil without sacrificing foil strength and to an electrolytic capacitor incorporating the etched anode foil of the present invention for use in an implantable cardioverter defibrillator (ICD).

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an electrolytic capacitor increases with the surface area of its electrodes, increasing the surface area of the anode foil results in increased capacitance per unit volume of the electrolytic capacitor. By electrolytically etching an anode foil, an enlargement of a surface area of the foil will occur. Electrolytic capacitors which are manufactured with such etched foils can obtain a given capacity with a smaller volume than an electrolytic capacitor which utilizes a foil with an unetched surface.

In a conventional electrolytic etching process, surface area of the foil is increased by electrochemically removing portions of the foil to create etch tunnels. For example, U.S. Pat. Nos. 4,474,657, 4,518,471 and 4,525,249 to Arora disclose the etching of aluminum electrolytic capacitor foil by passing the foil through an electrolyte bath. The preferred bath contains 3% hydrochloric acid and 1% aluminum as aluminum chloride. The etching is carried out under a direct current (DC) and at a temperature of 75° C. U.S. Pat. No. 4,474,657 is limited to the above single step. U.S. Pat. No. 4,518,471 adds a second step where the etched foil is treated in a similar bath with a lower current density and at a temperature of 80–82.5° C. U.S. Pat. No. 4,525,249 adds a different second step, where the etched foil is treated in a bath of 8% nitric acid and 2.6% aluminum as a nitrate, at a temperature of 85° C.

The ideal etching structure is a pure tunnel-like etch with defined and uniform tunnel diameters and without any undesirable pitting of the foil. As tunnel density (i.e., the number of tunnels per square centimeter) is increased, a corresponding enlargement of the overall surface area will occur. Larger surface area results in higher overall capacitance. However, as tunnel density increases more of the aluminum foil is removed, reducing the strength of the remaining foil. Therefore a compromise must be made between foil strength and capacitance gain.

Traditionally, electrolytic capacitor foil is etched uniformly over the surface. With a uniform, random tunnel etch, the useable capacitance gain of the anode foil is limited by the strength requirements of the foil in its particular application. Thus, there is a need in the art for an etch process which increases the overall capacitance of the foil while retaining foil strength.

To combat this problem, it is suggested in U.S. Pat. No. 5,660,737 to Elias et al. ("the Elias patent") selectively etch capacitor foil, such that areas which are not subject to stress during manufacturing are highly etched and those areas which are subject to stress during manufacturing are lightly etched or not etched at all. It is suggested in the Elias patent that for a stacked capacitor, the area where the weld tab is to be attached and the periphery of the plate should be masked. Similarly, the Elias patent suggests that for flattened or oval capacitor, in which a wound roll capacitor element is flattened in a press such that the material has a bend at each side and flat areas in between, that high gain foil to be used in the flat areas, while masking strengthens the locations where the sharp bends occur.

Alternatively, International published Application WO 00/19470 to O'Phelan et al. ("the O'Phelan reference") discloses a foil structure combining the durability of core-etched foils with the electrolyte flow advantages of tunnel-etched foils, having one or more holes or perforations and one or more cavities with a depth less than the foil thickness. The O'Phelan reference discloses that this "perforated-core-etched" foil can be made either by initially core-etching the foil to form cavities and then perforating the core-etched foil, or by initially perforating the foil and then etching the perforated foil to form the cavities. The O'Phelan reference suggests that the perforations can be formed using lasers, chemical etchants, or mechanical dies.

SUMMARY OF THE INVENTION

The present invention is directed to a method of etching anode foil in a non-uniform manner which increases the overall capacitance of the foil while retaining foil strength. In effect the foil may be etched to a higher degree in select regions, leaving a web of more lightly etched foil to retain strength.

In particular, by using a mask to protect a mesh grid of the foil from further etching, a previously etched foil can be further etched, prior to the widening step. Alternatively, the mask may be used in the initial etch, eliminating the need for the second process. The higher surface area in the exposed areas does not significantly decrease the strength of the foil as a whole.

In the preferred embodiment, anode foil is initially etched to produce an enlargement of surface area of at least 20 times in a high temperature etch electrolyte. Next, the foil is placed between two masks with a grid of openings which expose the foil in these areas to the etching solution. The exposed area can be as little as 10% of the total foil to as much as 95% of the total foil, preferably 30% to 70% of the total foil area. The pattern is configured in such a way that the enhanced area does not create large scale strength defects such as perforation holes and is held in a pattern such as a hexagonal array, random array or radial burst array, such that the exposed area perimeter can be round, square, hexagonal, or triangular. The masked foil is then replaced into the etching electrolyte solution to further etch the exposed areas of the foil. After widening and forming, a foil etched according to the present invention is suitable for use as an anode in an electrolytic capacitor. The anode foil will have enhanced capacitance without the increased brittleness, which would render the foil unuseable, typical of anode foils highly etch according to conventional methods.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1A:
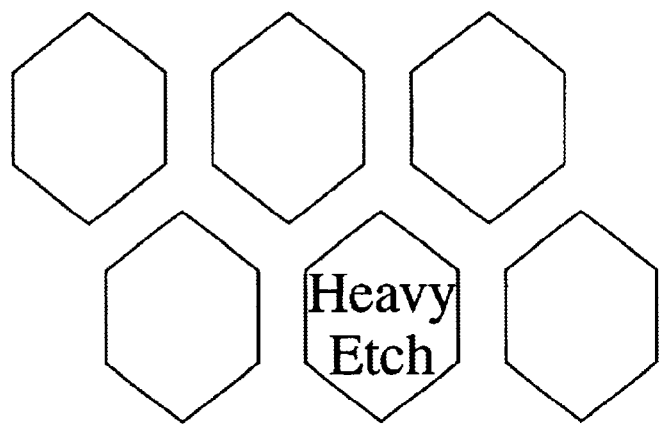
FIG. 1A is a mask pattern according to one embodiment of the present invention.

The present invention is directed to a method of non-uniform etching of anode foil to produce higher capacitance foil without sacrificing foil strength and to an electrolytic capacitor incorporating the etched anode foil of the present invention for use in an implantable cardioverter defibrillator (ICD).

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

According to the present invention, an anode metal foil to be etched is selected. Aluminum foil is preferred, because of its ability to produce a sufficient quality oxide layer, its conductive properties, and its wide commercial availability. However, other foils conventionally utilized in electrolytic capacitors could also be used, including tantalum, magnesium, titanium, niobium, zirconium and zinc. Preferably, a 100 to 125 micron thick, unetched, high purity (at least 99.98%) strip of aluminum foil with high cubicity, wherein at least 80% the crystalline aluminum structure is oriented in a normal position (i.e., a (1,0,0) orientation) relative to the surface of the foil, is used. Such foils are well-known in the art and are readily available from commercial sources.

Initially, the aluminum foil is etched, according to a conventional etch process, as known to those skilled in the relevant art, to produce an enlargement of surface area of at least 20 times. Surface area of the foil is increased by electrochemically removing portions of the foil to create etch tunnels, as disclosed in U.S. Pat. Nos. 4,474,657, 4,518,471, 4,525,249 and 5,715,133. Since the capacitance of an electrolytic capacitor increases with the surface area of its electrodes, increasing the surface area of the anode foil results in increased capacitance per unit volume of the electrolytic capacitor. By electrolytically etching an anode foil, an enlargement of a surface area of the foil will occur. Electrolytic capacitors which are manufactured with such etched foils can obtain a given capacity with a smaller volume than an electrolytic capacitor which utilizes a foil with an unetched surface. In a preferred embodiment, the aluminum foil is etched in a high temperature etch electrolyte that is based on a halide and/or oxyhalide, preferably a chloride and/or oxychloride, and contains an oxidizer such as peroxide, persulfate, cerium sulfate or sodium periodate, at a pH of 0.0. to 8.0, preferably a pH of 1.0 to 3.0. Other surface area enhancing etch solutions can be used with the present invention to produce similar results. In the preferred embodiment, the electrolyte etch solution consists of 0.1% to 10% NaCl, preferably 1.3% NaCl, and 0.1% to 10% $NaClO_4$, preferably 3.5% $NaClO_4$. The electrolyte is heated to a temperature of 80° C. to 100° C., with a preferred temperature of 85° C. The foil is placed in the etch electrolyte and etched at a current density of 0.1 to 0.3 amps/cm$^2$, preferably 0.15 amps/cm$^2$, and at an etch charge of 5 to 50 Coulombs/cm$^2$ for a specific amount of time, preferably 36 Coulombs/cm$^2$ for 4 minutes.

Figure 1B:
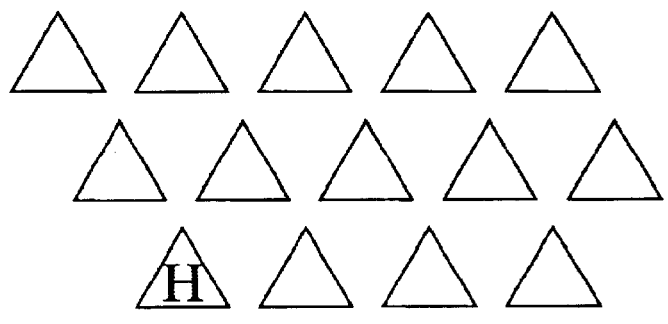
FIG. 1B is a mask pattern according to another embodiment of the present invention.
Figure 1C:
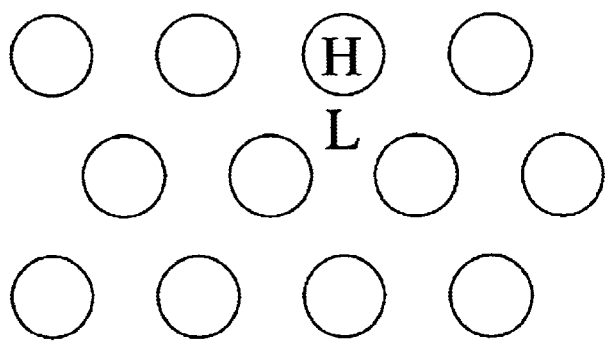
FIG. 1C is a mask pattern according to another embodiment of the present invention.
Figure 1D:
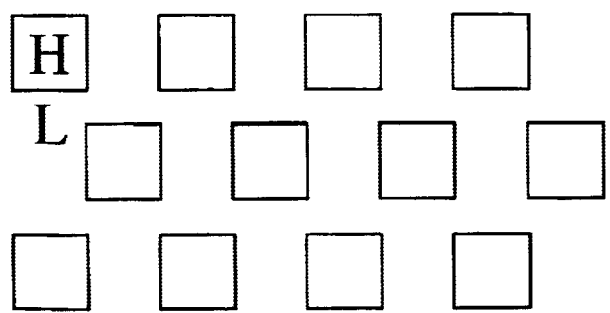
FIG. 1D is a mask pattern according to another embodiment of the present invention.
Figure 1E:
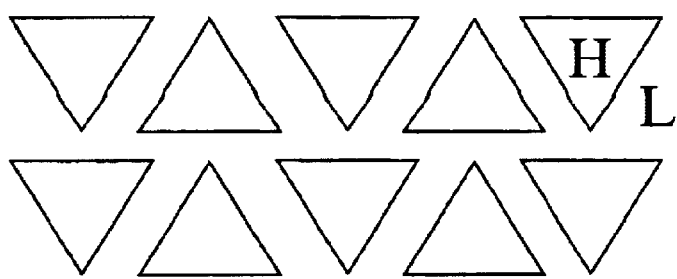
FIG. 1E is a mask pattern according to another embodiment of the present invention.
Figure 1F:
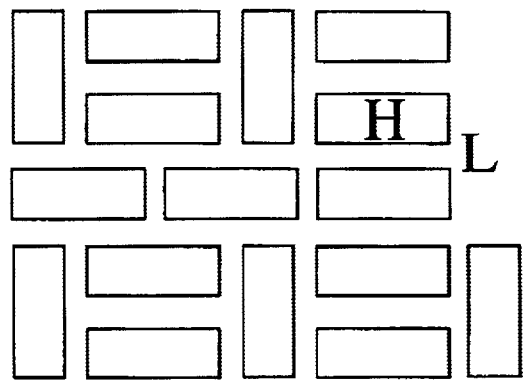
FIG. 1F is a mask pattern according to another embodiment of the present invention.
Figure 1G:
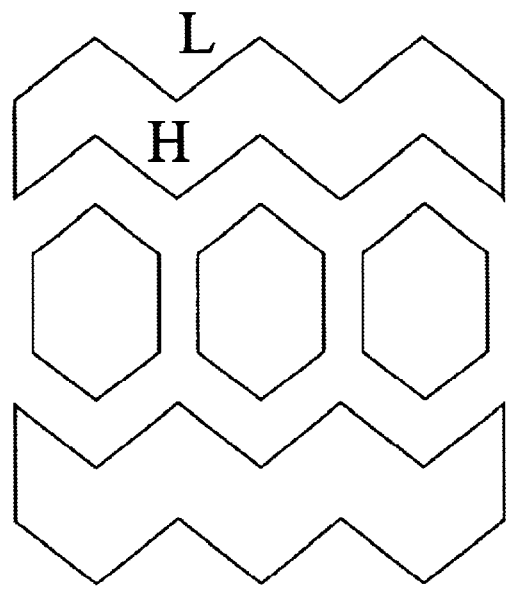
FIG. 1G is a mask pattern according to another embodiment of the present invention.
Figure 1H:
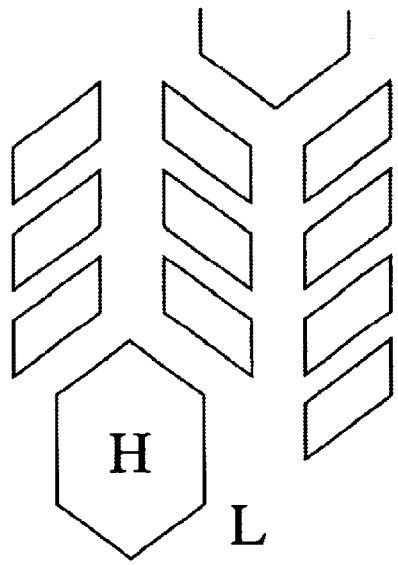
FIG. 1H is a mask pattern according to another embodiment of the present invention.

The etched foil is then placed between two masks with a grid of openings which expose the masked foil. The exposed area can be as little as 10% of the total foil area to as much as 95% of the total foil area, and is preferably 30% to 70% of the total foil area. The pattern is configured in such a way that the enhanced area does not create large scale strength defects such as perforation holes, divots, chunk removal and the like, and is held in a pattern such as a hexagonal array, random array, radial burst array, or other array that will produce the desired results of the present invention. Exemplary patterns are shown in, FIGS. 1A–1H. FIG. 1A represents a Close Packed Hexagonal array pattern. FIG. 1B represents a Tee Pee array pattern. FIG. 1C represents a Polka dot array pattern. FIG. 1D represents a Plaid array pattern. FIG. 1E represents a Inverted Triangle array pattern. FIG. 1F represents a Basket Weave array pattern. FIG. 1G represents a Chevron array pattern. Lastly, FIG. 1H represents a Herringbone array pattern. The preferred pattern according to the present invention is one that allows the capacitance gain to be enhanced, while the strength is maintained. The mask and pattern are chosen to optimize the etch area as compared to the masked area to achieve the full benefit of the present invention.

The masked foil is then replaced into the etching electrolyte solution to further etch, as discussed above, the exposed areas of the foil. As a result, the exposed areas of the foil are heavily etched, whereas the masked areas of the foil remain lightly etched. In an alternative embodiment, the etch electrolyte used to further etch the exposed area of the masked foil can be different from the initial electrolyte etch solution. Examples of alternative etching electrolytes are those based on a halide and/or oxyhalide, used singly or in combination, such as sodium chloride and/or hydrogen chloride, in possible combination with additional oxidizers known to those skilled in the art. Example etch solutions include 0.1 to 10% by weight sodium chloride; 0.1 to 10% by weight sodium chloride with varying concentrations of sulfate; 0.1 to 5% by weight hydrochloric acid with 0.1 to 30% by weight sulfuric acid; and other similar etch solutions. Alternatively, the masks according to the present invention may be used in the initial etch, eliminating the need for the second etch process. In this case, the masks would not be held flush against the foil, but would be held parallel to the foil with a small gap between the mask and the foil, and configured as described.

Next, the foil may be rinsed in an overflow demonized water bath for a time of 1 to 10 minutes, preferably 1.5 minutes.

The foil is then widened in a chloride or nitrate containing electrolyte solution known to those skilled in the art, such as that disclosed in U.S. Pat. Nos. 3,779,877 and 4,525,249. Then the foil is dipped into a deionized water bath at a temperature of 80° C. to 100° C., preferably 95° C. to form a hydrate later on the foil surface.

Next, a barrier oxide layer may be electrochemically formed onto one or both surfaces of the metal foil, sufficiently thick to support the intended use voltage, by placing the foil into a forming solution, including but not restricted to a solution based on azelaic acid, sebacic acid, suberic acid, adipic acid, dodecanedioic acid, citric acid or other related organic acids and salts, preferably a citric acid solution at a temperature of 80° C. to 100° C., preferably 85° C., at a current density of 1 mA/cm$^2$ to 40 mA/cm$^2$, preferably 16 mA/cm$^2$. A formation voltage of 50 to 800 Volts, preferably 445 V, can be applied to the foil to form the barrier oxide layer. The barrier oxide layer provides a high resistance to current passing between the electrolyte and the metal foils, also referred to as the leakage current. A high leakage current can result in the poor performance and reliability of an electrolytic capacitor. In particular, a high leakage current results in greater amount of charge leaking out of the capacitor once it has been charged.

A heat treatment of 500° C. ±20° C. may be applied to the foil following formation for 1 to 10 minutes, preferably 4 minutes. The foil is then returned to the forming solution and allowed to soak with no applied potential for 1 to 10 minutes, preferably 2 minutes. A second formation in the same electrolytic forming solution at high temperature is performed at a potential of 435 Volts.

Next, the foils are dipped in a suitable low concentration oxide-dissolving acid solution including but not restricted to phosphoric acid, formic acid, acetic acid, citric acid, oxalic acid, and acids of the halides, preferably phosphoric acid, a concentration of 1% to 10%, preferably a concentration of 2%, at a temperature of 60° C. to 90° C., preferably 70° C., for an time of 1 to 10 minutes, preferably 4 minutes.

Finally, the foils are reformed at a voltage of 435 Volts in a suitable forming solution, as discussed above, at a high temperature, preferably 80° C. to 100° C., more preferably 85° C.

Anode foils etched according to the present invention will have enhanced capacitance without the increased brittleness, which would render such foil unusable, typical of anode foils highly etched according to conventional methods. Foils that are processed according to the present invention can be utilized for a variety of applications that require a high capacitance foil. For example, as discussed above, high capacitance anode foils are widely utilized in electrolytic capacitors. Electrolytic capacitors, which are manufactured with anode foils etched according to the present invention, can obtain a given capacity with a smaller volume than currently available electrolytic capacitors and, therefore, can be very compact in size.

Electrolytic capacitors manufactured with anode foils etched according to the present invention can be utilized in ICDs, such as those described in U.S. Pat. No. 5,522,851 to Fayram, incorporated by reference herein in its entirety, such that the increased capacitance per unit volume of the electrolytic capacitor allows for a reduction in the size of the ICD.

Having now generally described the invention, the same will be more readily understood through reference to the following examples which are provided by way of illustration, and are not intended to be limiting of the present invention.

EXAMPLES

A sample aluminum anode foil was etched according to the present invention. The aluminum foil was first etched in a 1.3% NaCl and 3.5% NaClO$_4$ electrolyte etch solution at a temperature of 88° C., a current density of 0.15 amp/cm$^2$ and an etch charge of 36 Coulombs for four minutes; After the initial etch, a mask with holes in it was placed over the foil according to the present invention. The masked foil was placed back in the electrolyte etch solution and etched at a temperature of 85° C. and a current density of 0.15 amp/cm$^2$. The etched foil was then widened in an HNO$_3$ solution at 70° C., a current density of 0.15 amp/cm$^2$ and a charge of 78 Coulombs for eight minutes and 40 seconds. The foil was hydrated for eight minutes and then formed at 445 Volts down to 16 mA. The foil was dipped in a 2% phosphoric acid solution for 2 minutes and then rinsed for 3 minutes. Finally, the foil was reformed at 435 Volts down to 8 mA. According to the present invention, a porous, high capacitance foil was produced. A capacitance of 0.699 μF/cm$^2$ was obtained and 10 mL of water was measured to pass through the foil in 14 seconds.

By way of comparison, a second aluminum foil was poked with a needle to make an indentation all the way through the foil. The mechanically drilled foil was then etched in a 1.3% NaCl and 3.5% NaClO$_4$ electrolyte etch solution at a temperature of 85° C, a current density of 0.15 amp/cm$^2$ and an etch charge of 40 Coulombs for four minutes and 27 seconds. The etched foil was then widened and formed as discussed with respect to the first example above. A capacitance of 0.6563 μF/cm$^2$ was obtained and 10 mL of water was measured to pass through the foil in 6 seconds.

A third control aluminum foil was etched in a 1.3% NaCl and 3.5% NaClO$_4$ electrolyte etch solution at a temperature of 85° C., a current density of 0.15 amp/cm$^2$ and an etch charge of 36 Coulombs for four minutes. The etched foil was then widened and formed as discussed with respect to the first example above. A capacitance of 0.6799 μF/cm$^2$ was obtained and 10 mL of water was measured to pass through the foil in 16 seconds.

As shown from the experiment above, the present invention improved upon the standard etch process by producing a higher capacitance, more porous foil than the standard etch process. Additionally, while slightly less porous than mechanically drilled foil, the foil according to the present invention shows an improved capacitance gain not present in the mechanically drilled foil.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for etching an anode foil, comprising:
   (a) placing an unetched anode foil in a first high temperature etch electrolyte solution;
   (b) initially etching said anode foil;
   (c) placing a mask with a grid of openings over the etched anode foil exposing portions of the foil surface;
   (d) placing the masked anode foil in a second etch electrolyte solution; and
   (e) etching said masked anode foil, such that the exposed area of the foil is further etched.

2. A process according to claim 1, wherein said first etch electrolyte solution is based on a halide or oxyhalide and contains an oxidizer.

3. A process according to claim 2, wherein said first etch electrolyte ion is a chloride or oxychloride containing solution.

4. A process according to claim 2, wherein said oxidizer is chosen from the group consisting of peroxide, persulfate, cerium sulfate and sodium periodate.

5. A process according to claim 1, wherein said first etch electrolyte solution and said second etch electrolyte solution are the same.

6. A process according to claim 1, wherein said mask exposes 10% to 95% of the total area of the foil.

7. A process according to claim 6, wherein said mask exposes 30% to 70% of the total area of the foil.

8. A process according to claim 1, wherein said mask is configured in a pattern such that the exposed area can be re-etched without creating large scale strength defects in the foil.

9. A process according to claim 1, wherein said mask is configured in a hexagonal array pattern.

10. A process according to claim 1, wherein said mask is configured in a random array pattern.

11. A process according to claim 1, wherein said mask is configured in a radial burst array pattern.

12. A process according to claim 1, wherein said mask is configured such that the exposed area perimeter is round.

13. A process according to claim 1, wherein said mask is configured such that the exposed area perimeter is square.

14. A process according to claim 1, wherein said mask is configured such that the exposed area perimeter is hexagonal.

15. A process according to claim 1, wherein said mask is configured such that the exposed area perimeter is triangular.

* * * * *